United States Patent [19]

Sterling et al.

[11] Patent Number: 5,087,222
[45] Date of Patent: Feb. 11, 1992

[54] METHOD AND SYSTEM FOR DRESSING CATTLE AND THE LIKE

[75] Inventors: Bruce Sterling, Blue Springs, Mo.; Stuart McGrath, Overland Park, Kans.

[73] Assignee: Koch Supplies, Inc., Kansas City, Mo.

[21] Appl. No.: 506,106

[22] Filed: Apr. 9, 1990

[51] Int. Cl.$^5$ .................................................. A22B 5/16
[52] U.S. Cl. ................................. 452/127; 452/133; 452/187
[58] Field of Search .............. 17/21, 24, 44, 44.2, 17/50; 452/127, 128, 133, 178, 182, 183, 187

[56] References Cited

U.S. PATENT DOCUMENTS

| | | | |
|---|---|---|---|
| 2,494,138 | 1/1950 | De Moss | 17/21 |
| 2,871,509 | 2/1959 | Poupet | 17/21 |
| 3,736,622 | 6/1973 | Wallace | 17/24 |
| 3,930,284 | 1/1976 | Cook | 17/50 |
| 4,011,630 | 3/1977 | Ochylski | 17/21 |
| 4,021,884 | 5/1977 | Saltykov et al. | 17/21 |
| 4,299,010 | 11/1981 | Robertson et al. | 17/50 |
| 4,934,027 | 6/1990 | Kjorum et al. | 17/50 |

*Primary Examiner*—Frederick R. Schmidt
*Assistant Examiner*—Lawrence Cruz
*Attorney, Agent, or Firm*—Kokjer, Kircher, Bradley, Wharton, Bowman & Johnson

[57] ABSTRACT

A method and system for dressing cattle in which, after kill, the carcass is suspended in a generally horizontal position by at least one foreleg and one hind leg, with the legs uppermost, and transported while so suspended along a dressing line. In such position, the hide is partially cut longitudinally in the chin, neck and upper brisket area to form a longitudinal cut line. Thereafter, portions of the hide around the foreleg are grasped and pulled downwardly away from the skin to separate the hide from the skin on the forelegs, brisket and chin and form a gap between the underside of the hide and skin on the back of the neck. The carcass is then repositioned with the head up and tail down by suspension from at least one foreleg, the hide cut to form a cut line in the belly region from the brisket to the tail, and the edges of the hide along the cut line gripped and pulled back to separate the hide from the carcass. The method and system also provides for separating and tying the weasand and trimming the lips and eyelids while the carcass is in the horizontal position, and for eviscerating the carcass and removing the buns with the carcass in the head up, or vertical, position.

8 Claims, 6 Drawing Sheets

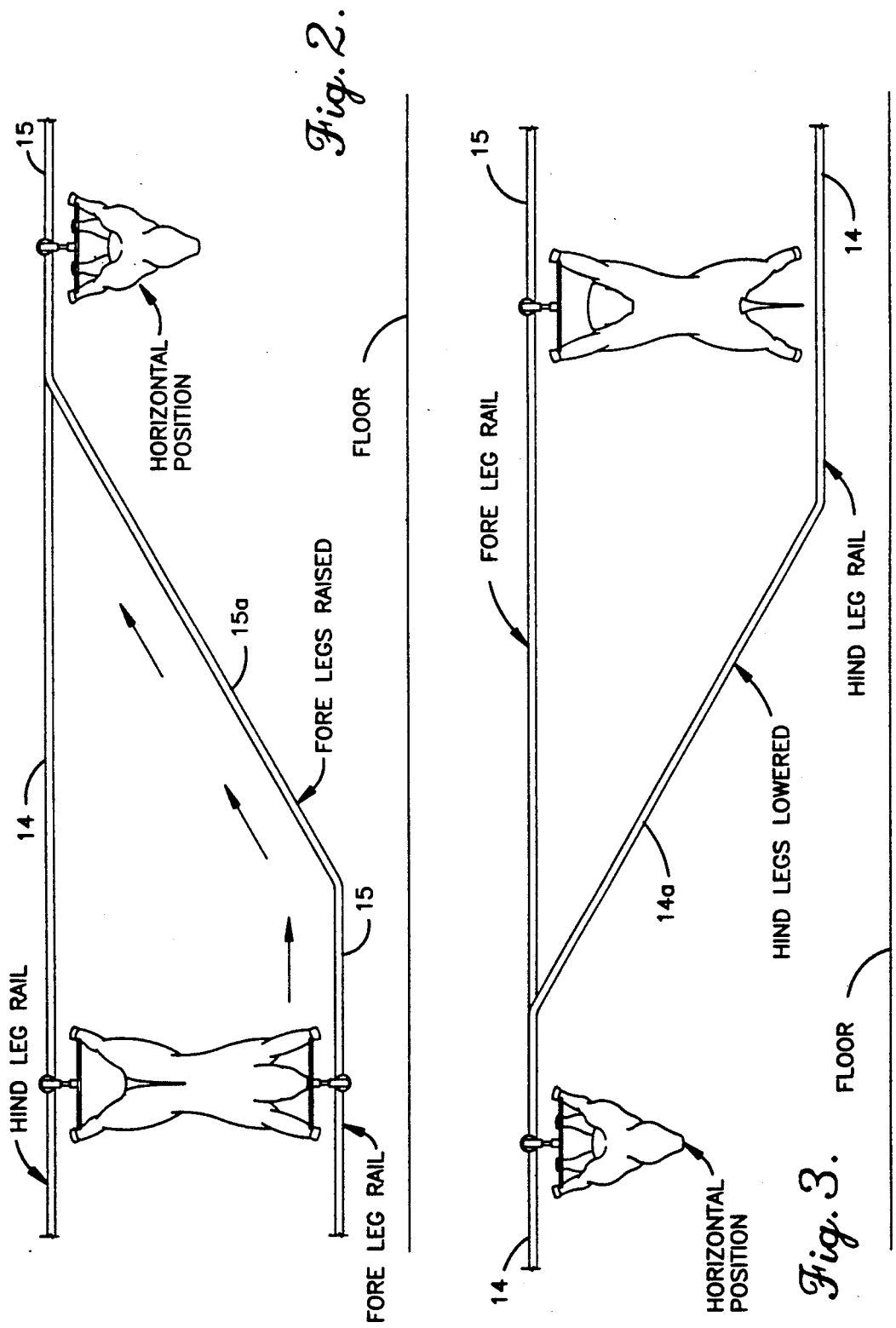

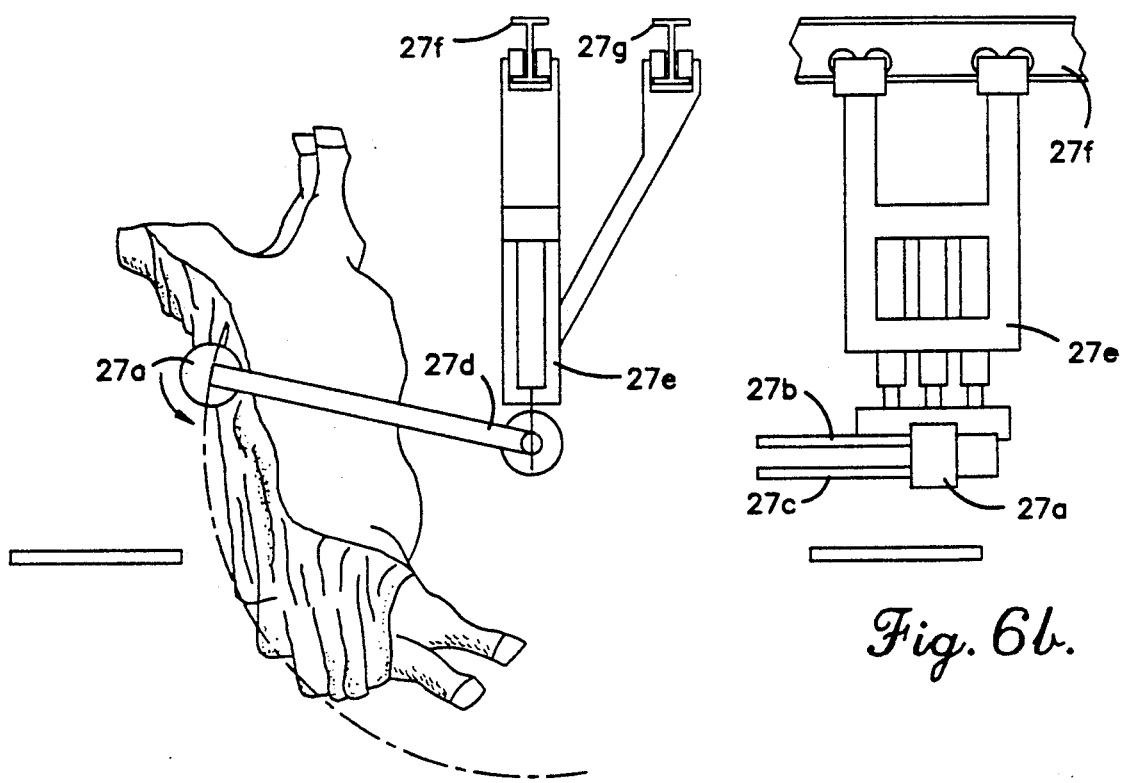
Fig. 6a.
Fig. 6b.
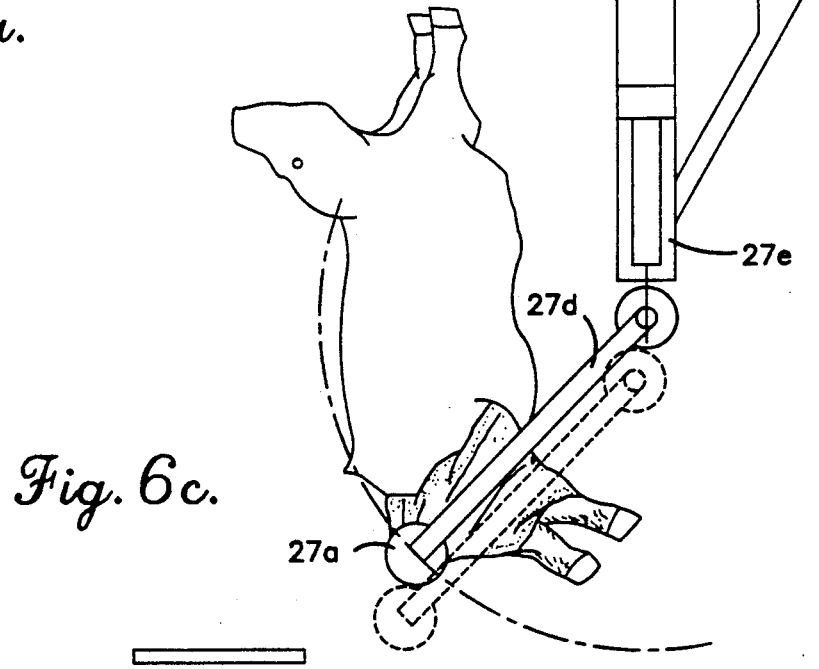
Fig. 6c.

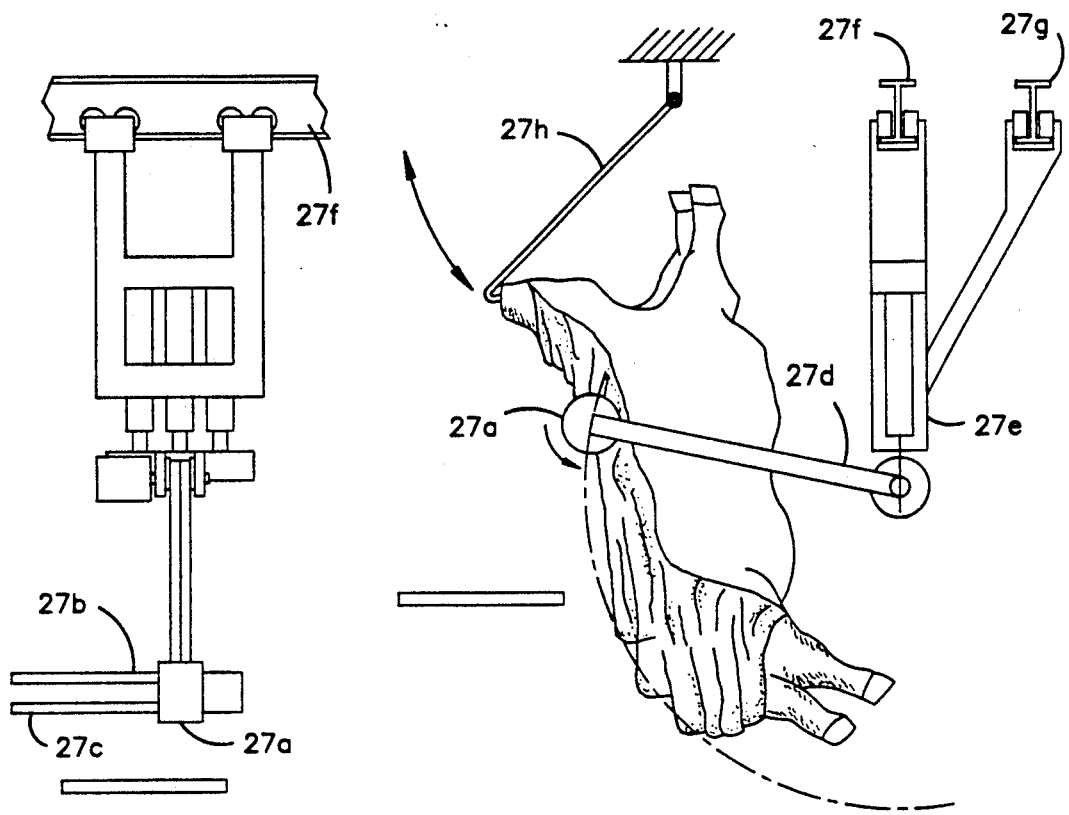
Fig. 6d.
Fig. 6e.
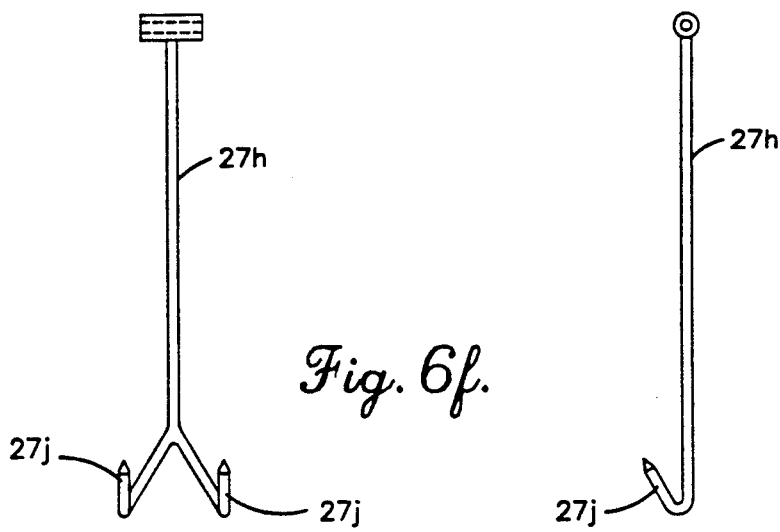
Fig. 6f.
Fig. 6g.

METHOD AND SYSTEM FOR DRESSING CATTLE AND THE LIKE

FIELD OF THE INVENTION

This invention lies in the field of systems and procedures for converting live cattle to dressed beef carcasses.

BACKGROUND OF THE INVENTION AND PRIOR ART

Prior to the 1950's, the commonly used method of dressing cattle in the beef industry throughout the world was to lay the carcass down in either a beef cradle or a Pritch plate. However, this process caused significant delays (also known as dead time) because the carcass was raised for bleeding and then put on its back for much of the hide removal, only to be lifted once again and suspended on its hind legs for finishing.

In the very early 1950's, a system was developed which involved suspending the beef carcass on one hind leg initially, eventually suspending on both hind legs and never removing the carcass from the overhead rail for any of the work done on it. This method is still the generally accepted practice used today.

The early 1960's brought new activity to the beef industry. The packing plants changed from multiple level operations to single story facilities. More and more emphasis was put on reducing the cost per head of dressing the carcass. With this came the combinations of higher units per man-hour and the demand for higher percentage of yield for every animal dressed.

The production rates grew from what was once considered a large beef plant at 100 carcasses dressed per hour to 400 plus per hour dressed today. The plants also lengthened the day by operating the dressing lines two shifts (16 hours per day). As a result, the workers' stress levels of production increased. Demand for: a) lower cost per head, b) higher yields per head, and c) better quality product intensified to the very high level that exists today. The industry now deals with fractional savings as earnestly as it used to deal with multiple percentage savings.

All improvements to the dressing procedures for beef have focused on changes while the carcass is suspended from the hind legs. While suspension of lamb and sheep carcasses in crosswise and inverted positions during various procedures in the dressing of these lightweight animals has been practiced in the past, to applicant's knowledge, there had been no conception prior to the present invention that procedures resembling the procedures followed in handling of lamb and sheep carcasses could or would be applicable or advantageous to the processing of cattle.

SUMMARY AND OBJECTS OF THE INVENTION

Broadly stated, the present invention provides a method and system for dressing cattle in which many of the procedures performed on the carcass are carried out in conjunction with positioning the carcass other than by hind leg suspension in the vertical position, i.e., with the head down. The overall dressing operation from bleeding to final trim and washing is in our invention still carried out in a substantially continuous line process. However, steps such as rod and weasand, hide pulling, and marking and cutting are effected at different support orientations for the carcass, all of which contribute to a highly effective dressing procedure which has the following benefits as compared with presently known beef dressing procedures.

1. Cleanliness throughout the process is improved greatly because of reduced carcass handling and flesh exposure, and the essentially down and away motion of all the hide removal functions;
2. Substantial ergonomic improvement;
3. Less skill on the part of workers required to handle specific tasks;
4. Reduction in required training for each operator position;
5. A reduction in total manpower required to effect a complete procedure on each carcass;
6. Less damage to the hide and great improvement in hide quality in the area where the most expensive part of the hide exists.
7. Reduction in amount of water required to carry out the processes.
8. Improved possibilities of automation of specific tasks.

DESCRIPTION OF THE DRAWINGS

In the accompanying drawings which form a part of the specification and are to be read in conjunction therewith and in which like reference numerals indicate like parts in the various views:

FIG. 1b, is a continuation, from left to right, of the schematic diagram of FIG. 1a.

FIG. 2 is a schematic view, in elevation, of the first transition section in which the carcasses move from hanging by the rear leg or legs alone to a generally horizontal position in which the carcass is suspended by the rear or hind legs and forelegs;

FIG. 3 is a schematic view, in elevation, of the second transition section in which the carcass is moved to vertical suspension by the front legs;

FIG. 6a is a schematic side view illustrating the manner of initiating the completion of the hide pull;

FIG. 6b is a schematic front elevation view, absent the carcass, of the hide pulling components illustrated in FIG. 6a;

FIG. 6c is a schematic side view illustrating the hide pull near completion;

FIG. 6d is a front view, absent the carcass, showing the components illustrated in FIG. 6c;

FIG. 6e is a schematic side view illustrating the hide pull near initiation and showing the use of nostril hook for immobilizing the head;

FIG. 6f is a front elevational view of the nostril hook; and

FIG. 6g is a side elevational view of the nostril hook.

Figure 1A:
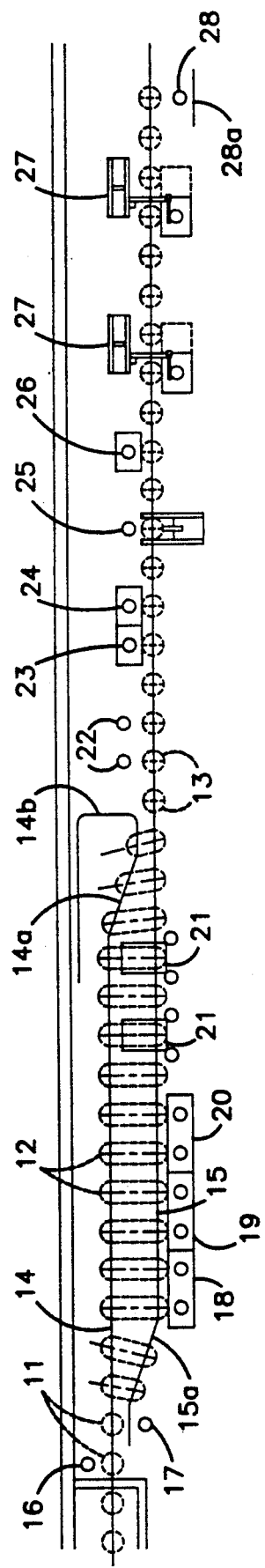
FIG. 1a, is a schematic diagram, looking from above, of the first portion of a beef dressing line in which the method of the invention is employed.
Figure 1B:
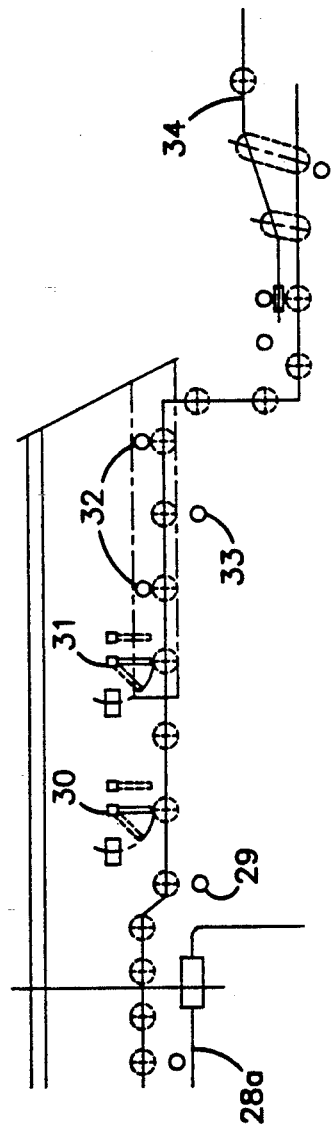

Referring now to the drawings and initially to FIGS. 1a and 1b, these figures schematically illustrate in plan view a continuous line in which the method according to the invention is performed. The manipulations of the carcass between traditional hanging by a hind leg through translation to horizontal suspension by both hind and forelegs, and suspension by the forelegs alone, with the head end of the carcass uppermost, are illustrated by the broken line circles 11, elongated broken line figures as at 12, and circles 13 which are intended to depict carcasses in series and in process at various stages of processing along the line. The overhead rail which carries moveable shackles for suspension by a hind leg is indicated at 14 and the overhead rail for front leg suspension which is spaced laterally from rail 14 is indicated at 15.

As is the case in the traditional methods of preparing a beef carcass for processing, the animal is moved through the stunning pen or the V-restrainer (not shown) in the same fashion as in the past. The animal is suspended from or by its hind or back leg by using a conventional shackle associated with a trolley which is carried by the rail 14.

At the outset, while the animal is still suspended from the hind leg, the dehorning operation takes place at worker position 16. Dehorning is done manually with the usual tools.

Next, at station 17, the front or forelegs are engaged with a shackle which is carried by a second conveyor rail identified earlier as rail 15. As shown in FIGS. 1a and 2, rail 15 has a riser portion 15a which forms a transition to an upper horizontal rail continuation which is parallel and at the same spaced from and level with rail 14. Thus, the animals are transposed in position to a horizontal orientation by suspension from both the front and rear legs.

At station 18, workers commence preparing the hide for removal. While at station 18, the front legs and shanks are marked to prepare the hide for removal for the first of three pulls. Marking is done in the traditional sense by cutting through the hide and forming slits.

At station 19, the rod and weasand procedure is carried out. At this station, the carcass is in the horizontal position and, consequently, the access to the weasand is at a convenient level. At this same station, lip and eyelid trimming can be carried out. The same tools as used in conventional beef dressing are used to weasand and trim the lips and eyelids.

At station 20, attention is given to clearing the hide away from the previously marked leg and shank area. This is done with conventional knives and by workers who are familiar with the procedure. Only enough hide is cleared to provide a purchase area for the subsequent operations relating to hide pulling.

Figure 4B:
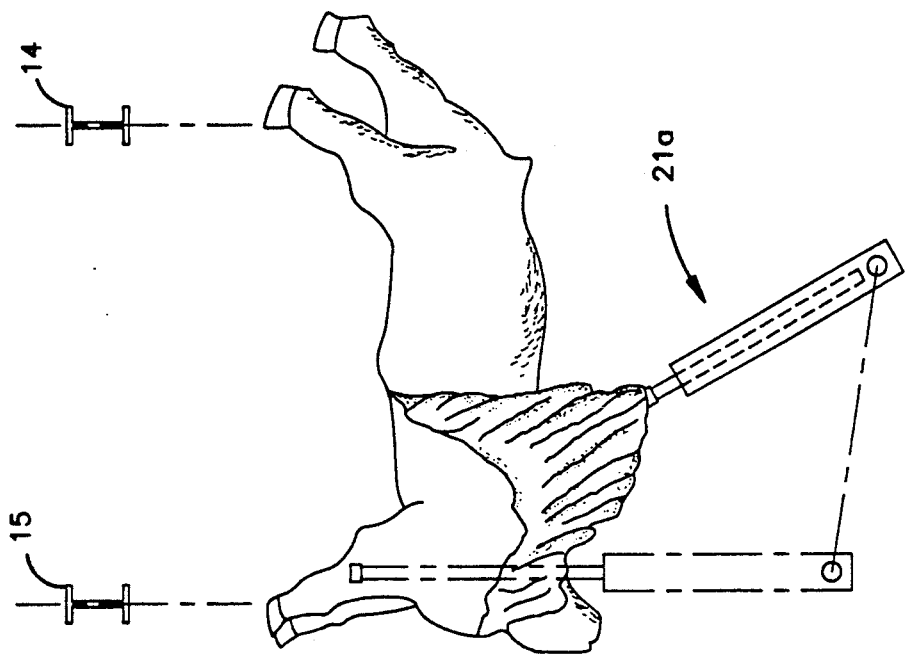
FIG. 4b, is a view similar to FIG. 4a, but showing the condition of the hide and carcass at the termination of the first pull.
Figure 4A:
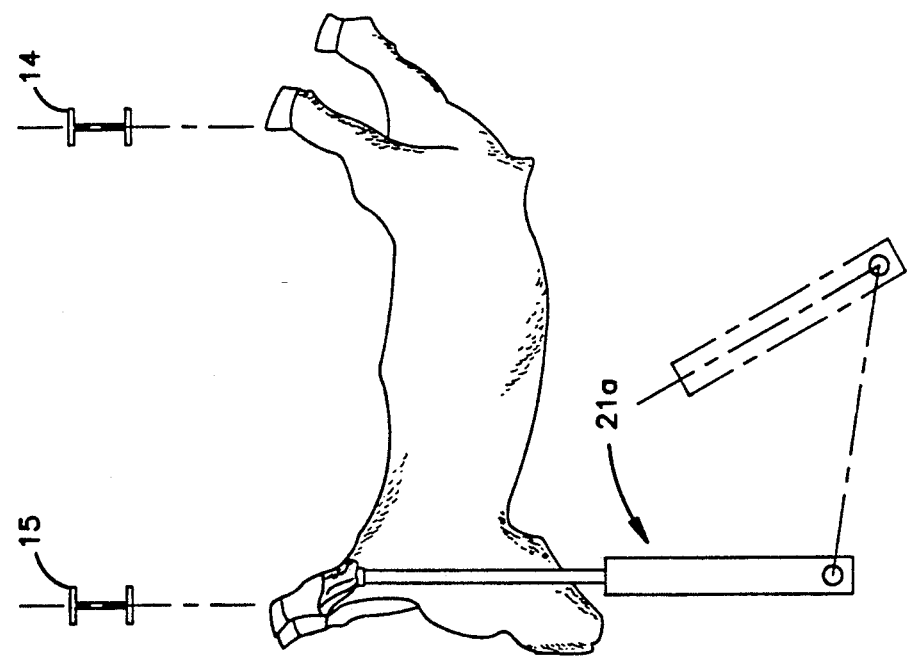
FIG. 4a, is a schematic view illustrating the initial step of the first hide pull from the forelegs.

The first of three distinct pulling steps for the hide occurs at station 21. Pullers, as illustrated at 21a in schematic form (see FIG. 4a), are engaged with the skin which has been freed from the foreleg and shank, and the pull is directed downwardly toward the head and shoulder. The motion of the puller takes the hide from near the foreleg hoof area towards the backbone and while doing so, moves in the direction of the rump area. The pull will clear the shoulders, and part of the face hide and will pull far enough to provide an opening at the back of the neck between the hide and the neck of the carcass as illustrated at X in FIG. 4b, the purpose of which will be described later. The operator of the shoulder puller should have an air knife that can be used to assist in hide removal to facilitate the separation of the hide from the carcass, as pulling continues. Pulling of the foreleg and shoulder area is essentially complete when the hide and carcass are in the relative condition illustrated in FIG. 4B.

From station 21, the carcass again moves through a transitional positioning which results in suspension of the carcass entirely by the forelegs. See FIG. 3, which illustrates the downward transition 14a of rail 14. The shackles which have been attached to the rear leg or legs are released at the end of rail 14 and the carcass travels forwardly on rail 15 suspended by the forelegs alone. The chain or other conveyor associated with rail 14 is returned to the input end, as illustrated at 14b in FIG. 1a.

When the carcass in the inverted position reaches station 22, it is completely suspended from the two front legs with the hind legs pointing toward the floor. Hock cutters are used at this time to remove the rear legs at the break joint, located midway up on the rear leg. The switch part of the tail is also removed at this station.

It will be evident from the description given that throughout the entire procedure to this point, there has been no activity that attempts to remove the hide on or around the hind back legs.

At station 23, preparations for the next pulling step occur. An operator proceeds to form rip marks in the hide which begin where the hide has stopped pulling away as a result of the shoulder pulling and the rip mark is made down the carcass, stopping about two-thirds of the way down the belly.

The carcass moves then to station 24, which is where operators use air knives to clear the hide back just far enough from the rip marks to allow placing of gripper clamps (see FIG. 5a) on the hide. The hide is cut free only enough to facilitate the engagement of the grippers, the emphasis being on protecting the carcass as a whole from contamination as much as possible.

Figure 5B:
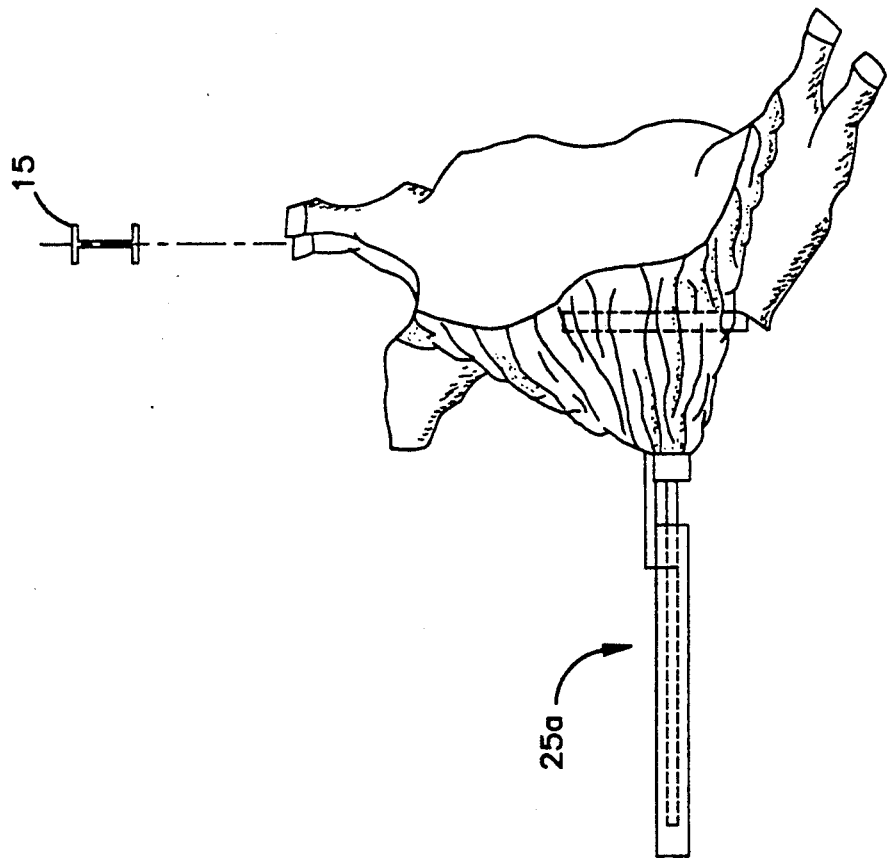
FIG. 5b, is a view similar to FIG. 5a, showing the condition of the hide and carcass at the termination of the side pull.
Figure 5A:
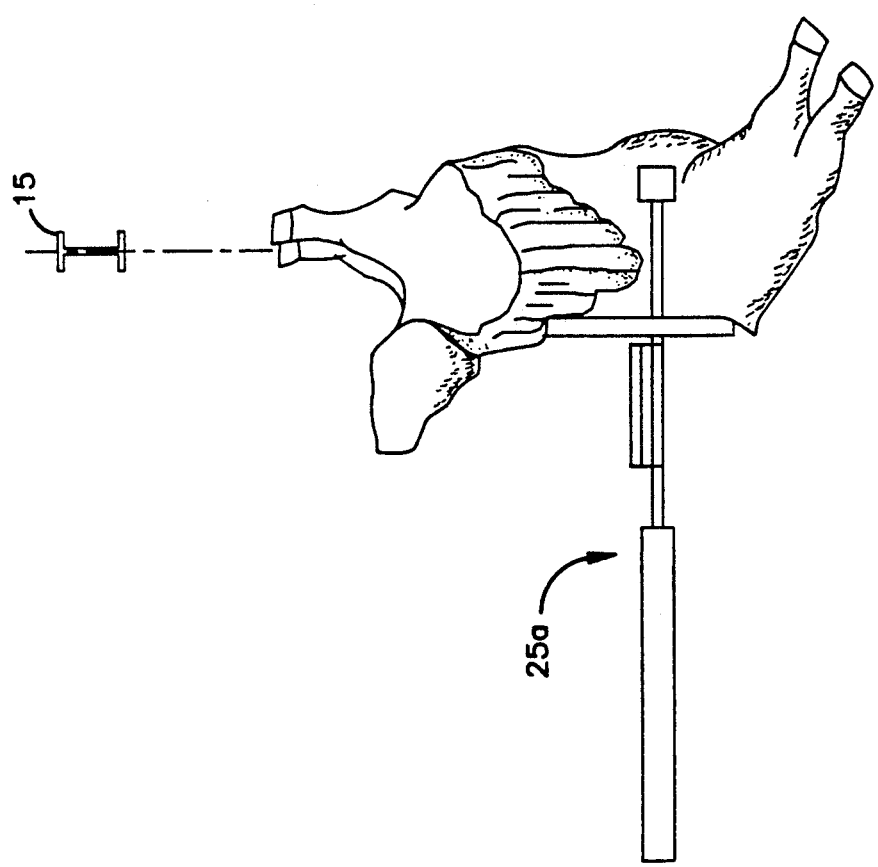
FIG. 5a, is a schematic view illustrating the initiation of the side hide pull.

A side puller assembly schematically illustrated at 25a in FIG. 5a, located at station 25. Parallel pulling mechanisms are located on opposite sides of the carcass and are engaged with the freed carcass portions. The pull is essentially straight back in a horizontal direction and as illustrated in FIG. 5b, the hide is pulled so that the sides, forelegs and belly of the carcass are largely free, leaving the head, back, rump and hind legs still hide covered. Again at this station as another pulling step, the operators can use air knives as a means of assisting the pulling operation and making a clean pull.

At station 26, subsequent to the side pulling, an operator breaks the vellum so as to make the final preparation of the carcass for step three in the pulling process.

The final pull of the hide is schematically represented in FIGS. 6a and 6b. As noted, a motor driven rotor assembly 27a having parallel arms 27b, 27c is positioned adjacent the opening X (FIG. 4b) between the hide and the carcass neck, located just below the head and as previously described. The rotor drives the parallel arms 27b and 27c, one of which is inserted through the opening between the hide and neck and the other of which lies on the outside. The rotor assembly 27a is carried on an arm 27d which in turn is connected with a moveable cylinder and piston assembly 27e suspended from support rails 27f and 27g. As the rotor assembly is rotated, the puller arm 27d begins a counterclockwise motion that combined with the rotor and arm motion, removes the balance of face hide. It may be desirable, to facilitate this pull, to insert the prongs 27j of a rod 27h, as illustrated in FIG. 6c, thus to hold the head against the pulling action. Rod 27h is pivoted as at 29 to a suitable stationary anchor or support so that it can be pivoted away from its operative position which so desired. The rotating and pulling motion continues until the hide has been completely removed from the carcass so that the carcass can move on down the line.

Following hide removal and while the carcass is still suspended on the front legs and at station 28, the head is removed from the carcass. Because the head is hanging backwards, it is still located at the top of the carcass. The person assigned to this position will have an advantage by being able to work at a comfortable level. As in a conventional process, after removal of the head, the head is hung on a separate conveyor 28a that continues through head washing and head workup (not shown).

After head removal, the carcass moves to station 29, where the tail is removed.

At station 30, the brisket is sawed to open up the brisket to access to the internal organs. The carcass is still in the inverted position and, consequently, the internal organs are not pressing against the cutting area but are rather lying low and towards the back of the carcass because the front legs are on top.

The carcass then moves to station 31, where the belly is opened through the use of an appropriate cutting tool.

The carcass has now been prepared for and moves to evisceration stations indicated at 32. Evisceration is easily accomplished because of the inverted position of the animal because with the carcass in the inverted position and the earlier cuts as described made, the internal components will tend to be ready to fall out on their own. Clamping of the anus channel can take place at this time.

The bung is dropped at station 33 and this step, which is again performed by an operator will work somewhat differently because the strain of the internal organs is no longer on the bung.

Following bung dropping, the process of rehanging the carcass on the hind legs by inserting trolley hooks or shackles into the legs is carried out. The front legs are unshackled and weight of the entire carcass is transferred back to the hind legs as they move up to the top position as at 34. The carcass actually passes back through the horizontal position and moves finally to the original hind or back leg suspended condition, a reversal of the process shown in FIGS. 2 and 3.

Final splitting and the balance of operations of beef dressing is carried out in the traditional fashion and will not be further described here.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A method of dehiding and dressing a beef carcass comprising the steps of
   (a) suspending said carcass by at least one foreleg and one hind leg, with the legs uppermost and the carcass in a substantially horizontal position, and while maintaining said carcass in said position;
   (b) partially cutting the hide longitudinally in the chin, neck and upper brisket areas to form a longitudinal cut line;
   (c) freeing portions of the hide around the foreleg and grasping the free hide and pulling it downwardly away from the skin to separate the hide from the skin on the forelegs, brisket and chin, and to form a gap between the underside of the hide and skin on the back of the neck,
   (d) repositioning said carcass and suspending it from at least one foreleg in the inverted position with the head up and tail down;
   (e) cutting said hide to form a line of separation in the belly region from the brisket toward the tail; and
   (f) grasping the confronting edges of said hide along said cut and pulling back generally horizontally to separate the hide on opposite sides from the sides of the carcass.

2. The method as in claim 1, including the steps of
   (g) applying a downward pulling force to said hide at the said gap whereby to pull the hide free of the back of the head, back of the carcass and continuing the pull past the hind legs to complete separation of the hide from the carcass.

3. The method of claim 2, including the steps of
   (h) while said carcass is in said inverted position, slitting the brisket and belly, and eviscerating the carcass.

4. The method as in claim 1, including the steps of
   (i) while said carcass is in the horizontal position, separating and tying the weasand.

5. The method as in claim 1, including the steps of
   (j) while said carcass is in the horizontal position, trimming the lips and eyelids from the carcass.

6. The method of claim 1, including the step of
   (k) while said carcass is in the inverted position, removing the bung.

7. A method of dehiding and dressing beef carcasses, including the steps of
   (a) hanging said carcasses in series from a hind leg and advancing them in series through a dressing line;
   (b) in said dressing line, repositioning each carcass as it reaches a predetermined location in the line to a substantially horizontal position, with the carcass suspended by at least one foreleg and at least one hind leg;
   (c) freeing the hide generally from the upper brisket, chin and shoulder area while the carcass is in said horizontal position;
   (d) repositioning each said carcass after step (c) and suspending it from at least one foreleg so that the carcass is essentially inverted with the head up and tail down; and
   (e) completing the separation of the hide from the carcass while such carcass is in said inverted position.

8. The method as in claim 2, including the step of
   (h) applying a force to the head at the nose end to act against the downward pulling force acting on the head.

* * * * *